(12) United States Patent
Lowe

(10) Patent No.: US 6,688,713 B2
(45) Date of Patent: Feb. 10, 2004

(54) TELEVISION BASE CASTING

(75) Inventor: Jerry Bailey Lowe, San Clemente, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 74 days.

(21) Appl. No.: 09/898,411

(22) Filed: Jul. 2, 2001

(65) Prior Publication Data

US 2003/0001979 A1 Jan. 2, 2003

(51) Int. Cl.[7] .................................................. H04N 5/64
(52) U.S. Cl. ........................ 312/351.2; 312/7.2; 348/836
(58) Field of Search .............................. 312/7.2, 223.1, 312/351.1, 351.2; 348/836, 839, 784; 248/679

(56) References Cited

U.S. PATENT DOCUMENTS

| | | | |
|---|---|---|---|
| 2,916,233 A | * 12/1959 | Ecker | 248/679 |
| 4,108,510 A | 8/1978 | Iimura | |
| 4,145,857 A | 3/1979 | Tilsen | |
| 4,438,606 A | * 3/1984 | Chardon et al. | 52/79.1 |
| 4,445,730 A | 5/1984 | Cross | |
| 4,743,414 A | * 5/1988 | Sudrabin | 264/35 |
| 4,946,725 A | * 8/1990 | Harlan | 428/73 |
| 5,135,293 A | 8/1992 | St-Germain et al. | |
| 5,786,933 A | * 7/1998 | Iwai et al. | 359/460 |
| 6,095,476 A | * 8/2000 | Mathis | 248/422 |
| 6,129,434 A | * 10/2000 | Melane et al. | 312/351.1 |
| 6,545,729 B1 | * 4/2003 | Lowe | 348/836 |

FOREIGN PATENT DOCUMENTS

| | | | |
|---|---|---|---|
| DE | 102 33 981 | * | 2/2003 |
| FR | 2776850 | * | 10/1999 |

* cited by examiner

Primary Examiner—Janet M. Wilkens
(74) Attorney, Agent, or Firm—Orrick, Herrington & Sutcliffe LLP

(57) ABSTRACT

An integrally weighted base suitable for attachment to a bottom surface of an enclosure to form an integrally weighted cabinet. The integrally weighted cabinet is able to satisfy load bearing and tip over standards without requiring the addition of separate weights. The base preferably includes a frame and fill material disposed within the frame. The frame may be metal or plastic. Fill material is poured into the frame and allowed to set. The fill material may be any suitable material having a density sufficient to act as a weight or counterbalance, such as, e.g., concrete, a concrete and fiber mixture, metal, or a concrete and metal mixture. The base may further include a plurality of openings to dissipate heat from within the interior space of the cabinet. In one implementation of the present invention, the base replaces a bottom panel of a typical PTV cabinet and further eliminates the need for attaching separate weights onto a bottom panel of a typical PTV cabinet.

20 Claims, 6 Drawing Sheets

TELEVISION BASE CASTING

FIELD OF THE INVENTION

The present invention relates generally to projection television sets, and more particularly to an integrally weighted base that facilitates structural and operational stability in a projection television enclosure.

BACKGROUND

Projection televisions (PTVs) or "big screen" TVs are a popular alternative to traditional picture tube televisions because they provide comparably larger viewable screens that cannot be efficiently produced using conventional picture tubes. PTV cabinets are presently designed to hold electrical and optical components, as required, to decipher and project a television picture on a screen generally on the front of the cabinet. The most common PTV on the market today projects pictures created via appropriate electrical and optical components onto a mirror within a box containing the entire apparatus so that the picture reflected to a screen is as large as possible for the volume occupied by the cabinet enclosing it. Currently, PTV screens typically range in size from about 45 to about 73 inches along their diagonal, while the cabinets typically range in size from about 48 inches to over 65 inches in height, from about 38 inches to over 65 inches in width, and from about 22 inches to over 29 inches in depth. The cabinets are assembled in an aesthetically appealing manner as required to hold the electrical components, light generator(s), and lenses, mirror and screen in the relationship required to obtain the desired televised picture.

Most PTVs marketed today include a cabinet constructed from multiple pieces of particleboard cut and glued together. Some cabinets also have plastic components held to the basic cabinet structure with screws or other fasteners. The number of plastic components and particleboard pieces needed to form such cabinets typically range in excess of fifty (50) pieces. Because of the size of PTVs, and the particleboard from which the cabinets are typically constructed, PTVs tend to be quite heavy and difficult to maneuver.

Alternative methods of manufacture are available that may reduce the overall weight of these cabinets and the number of components necessary to construct such cabinets. For instance, injection molding could be used to form such cabinets out of plastic. Another alternative would be to vacuum form the cabinetry out of plastic. A further alternative would be to form the cabinet out of molded plastic foam.

The use of lighter weight materials to manufacture PTV cabinets leads to an additional problem in that the newer, light weight cabinets are easier to tip over relative to the traditional particle board cabinets. For example, in addition to being lighter in weight, newer PTV cabinets are also increasingly shallower in depth relative to traditional cabinets. The shallower depth cabinets have a smaller footprint but still generally maintain the same height as traditional PTV cabinets. Consequently, tip over for the newer cabinets becomes more likely when compared with the traditional cabinets.

In order to ensure that they produce PTVs that are not likely to tip over, PTV manufacturers typically strive to meet certain safety standards with respect to PTVs and PTV enclosures. One current standard is the Underwriters Laboratories ("UL") load standard. The UL load standard requires that a PTV cabinet must be able to withstand 25 lbs of force applied to any extremity of the cabinet without tipping over. Without the addition of some weight to the lower portion of the lighter, shallower PTV cabinets, these cabinets are more likely to fail the UL tip over test when compared with traditional particle board cabinets. To address this problem, those skilled in the art currently add counterweights to the base or lower portions of the lighter weight and shallower cabinets in order to enable these cabinets to withstand at least 25 lbs of force applied to any of their extremities without tipping over. Using one example calculation, the total weight for a PTV cabinet to avoid tip over is determined using the following formula:

Minimum Weight=(25 lbs)(Height of the Cabinet/Depth of the Cabinet).

Turning to FIG. 1, a conventional enclosure 10 of a PTV 50 is illustrated. The conventional enclosure 10 includes top 12, bottom 14, front 16, and rear 18 panels. Side panels connecting the front 16 and rear 18 panels are also included, but not illustrated. The conventional enclosure 10 is typically divided by an internal wall 24 into two compartments, i.e., an upper 20 and a lower 22 compartment. Cathode ray tubes (CRTs) 26 and printed wiring boards (PWBs) 30 are typically mounted in the lower compartment 22, while a mirror M and a screen S are mounted in the upper compartment 20. At least one projection lens 28 typically extends from the lower compartment 22 into the upper compartment 20 through the internal wall 24. The upper compartment 20 is typically tightly sealed from the lower compartment 22 to protect the inside of the upper compartment 20 from dust and other foreign materials. The lower compartment 22 typically includes one or more sets of ventilation holes to exhaust heat radiating from the CRTs 26 and the PWBs 30. As shown, the lower compartment 22 may include a first set of ventilation holes 32 positioned adjacent the top of the lower compartment 22 and a second set of ventilation holes 34 positioned adjacent the bottom of the lower compartment 22. When the enclosure 10 is made shallower and/or is constructed using lighter weight materials and methods, such as those previously discussed, counterweights 36 are typically positioned in the lower compartment 22, and normally on top of the bottom panel 14. The counterweights 36 increase the enclosure's total weight and lower the enclosure's center of gravity. As a result, the counterweights 36 increase the amount of force required to tip over the enclosure 10. Currently, counterweights 36, which may be metal, clay, or concrete bricks, additional particle board base pieces, or any other suitable counterweights, are tied or otherwise physically attached to the bottom panel 14 of the enclosure 10. The number of counterweights 36 used in the cabinet 10, to enable the enclosure 10 to pass the UL tip over test, may be determined with the aforementioned formula.

The current methods for balancing a shallower, lighter PTV cabinet result in several disadvantages. For example, the use of additional particle board bases to increase the weight and stability of these cabinets often requires the additional use of forest products, thereby contributing to long term environmental deleterious effects. Also, the additional step of adding a separate weight to a cabinet increases the complexity and cost of manufacturing the lighter weight PTV cabinets. There is also a danger that the weights may not be properly secured to the cabinet during construction, thereby resulting in safety issues should the weights become dislodged during transport of the cabinet, or during the lifetime of the cabinet. For example, the weights may become dislodged and repositioned in an area that causes the cabinet to become unbalanced and more likely to tip over.

Those skilled in the art have failed to provide for a light weight PTV cabinet capable of passing standard load tests without the addition of costly counterweights. Thus, it would be desirable to provide for a PTV cabinet or an integrally weighted base suitable for attachment to a PTV cabinet that is easy and less costly to manufacture, mitigates environmental damage by decreasing the reliance on wood as a material for counterweights, is less vulnerable to manufacturing irregularities, and results in a cabinet that meets any applicable load or tip over standards for PTV cabinets.

SUMMARY OF THE INVENTION

The present invention is directed to an integrally weighted base for use with an enclosure to form an integrally weighted PTV cabinet. The base acts to stabilize the cabinet and enables the cabinet to satisfy load and tip over standards. The base of the present invention is particularly useful when implemented as part of a lighter weight PTV cabinet, but is also capable of being used with traditional, wood-based PTV cabinets.

In one embodiment, a base for attachment to a bottom of an enclosure, thereby forming a cabinet, is provided. The enclosure has a plurality of side panels that form a footprint. The base is configured to conform to the footprint of the enclosure. The base includes a frame that conforms to the footprint and fill material set within the frame. The fill material may be concrete, metal, a mixture of concrete and fiber, a mixture of concrete and metal, or any other suitable material. The frame may be metal, plastic, or any other suitable material. Additionally, the frame may be divided into a raised area with a top surface and a lower region adjacent the raised area. In this embodiment, the fill material is disposed within the lower region of the frame. A plurality of openings may also be provided on the top surface of the raised area, allowing for ventilation to facilitate the dissipation of heat from within the interior of a cabinet. Elevated portions having openings configured for receiving an attachment element may be provided within the lower region that allows for a component to be secured to the base.

In another embodiment, a base is provided that is formed from a hardened material conformed to the footprint of an enclosure. In this embodiment, the base does not include a separate frame. The base may be formed of metal, a mixture of concrete and fiber, or a mixture of concrete and metal. The base may be divided into a raised area having a top surface and a lower region adjacent the raised area. The top surface of the raised area may further include a plurality of ventilation openings allowing for heat dissipation.

Another embodiment of the present invention is a cabinet for a PTV having an enclosure with a mirror, a plurality of CRTs, a projection lens, and a plurality of panels, and a base attached to the enclosure. The enclosure preferably includes a top panel, a front panel, a rear panel, and side panels extending between the front and rear panels. Attached to the top portion, and opposite the top panel of the enclosure, is a base having a frame and fill material disposed in the frame. The base provides stability to the cabinet and enables the cabinet to satisfy standard load bearing requirements. The base may also include at least one raised area, each raised area having a top surface, at least one lower region adjacent to each raised area, and fill material deposited into each lower region. The top surface of the raised region may include a plurality of vent openings allowing heat built up within the enclosure to dissipate therethrough. In another embodiment, additional elevated regions are present on the base that allow for components to be securably attached to the base. The fill material is preferably a material sufficient to provide the necessary weight to the enclosure. Exemplary fill materials include concrete, a concrete and fiber mixture, a concrete and metal mixture, and a metallic material.

In another aspect of the present invention, a method of manufacturing an integrally weighted base suitable for attachment to an enclosure of a television cabinet is provided. A frame is manufactured that conforms to the footprint exhibited by the panels of the enclosure. The frame may be, for example, a sheet metal stamping, molded plastic, metal casting, or wood. A fill material, which may be, e.g., concrete, a concrete and fiber mixture, a concrete and metal mixture, or a metal substance, is poured into the frame and allowed to set or harden. To form a frameless base, a mold is formed that conforms to the footprint of the enclosure and a compound is poured into the mold and allowed to set. The fill material is allowed to set and is then abraded or ground such that the fill material forms a substantially flat surface. If the frame is divided into raised and lowered regions, the fill material is typically poured substantially within the lower regions of the base, although some fill material may accumulate atop the raised region. Here, after the fill material has set, the fill material is abraded or ground such that the fill material forms a substantially flat surface that is substantially level with the top surface of the raised region.

Other objects and features of the present invention will become apparent from consideration of the following description taken in conjunction with accompanying drawings.

DETAILED DESCRIPTION

The present invention is adaptable for incorporation into cabinets for a variety of devices or display devices. The present invention is particularly useful for implementation by manufacturers of cabinets who attempt to make reasonable efforts to ensure that their cabinets are capable of withstanding a reasonable amount of force to an extremity without tipping over. For example, the present invention is particularly suited for use with cabinets to prevent the cabinets from tipping over due to, e.g., children or animals climbing on or playing around the cabinets. The following discussion, however, focuses on cabinets for PTV sets for exemplary purposes only. In one preferred embodiment, a base having a frame and fill material disposed within the frame is provided. The base preferably conforms to the shape of the enclosure of a cabinet to which it is to be attached, thereby forming the bottom portion of the cabinet. The frame of the base may comprise a sheet metal stamping, metal casting, molded plastic, wood, or the like. The frames preferably conform substantially to the footprint of the enclosure to which the resultant frame, and therefore base, will be attached. Alternatively, the base may be formed with substantially only the fill material, i.e., frameless, by manufacturing a mold that conforms to the footprint of the enclosure and pouring the fill material directly into the mold.

Figures 1, 2:
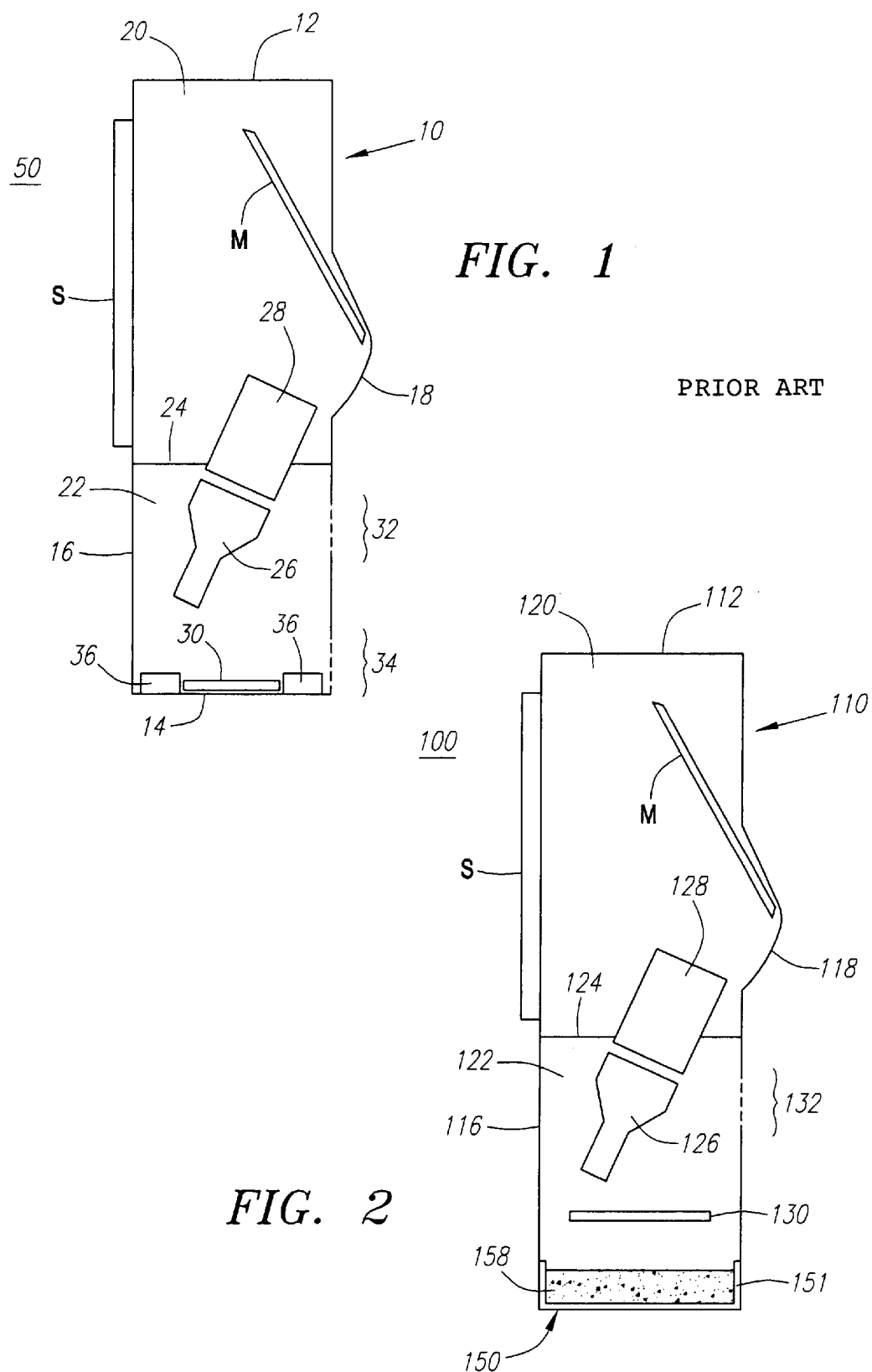
FIG. 1 is a side view of a projection television set of the prior art.
FIG. 2 is a side view of a base of the present invention, having a frame and fill material disposed therein, attached to a PTV cabinet.

Illustrated in FIG. 2 is one embodiment of a PTV cabinet 100 using the present invention. The PTV cabinet 100 includes an enclosure 110 having a top panel 112, a front panel 116, a rear panel 118, and side panels (not shown) extending between the front 116 and rear 118 panels and in further connection with the top panel 112. Furthermore, an enclosure suitable for use with the present invention is not limited to one having a front, rear, and two side panels. Rather, the present invention is capable of use with an enclosure that has any plurality of side panels, such as, e.g., an enclosure shaped like an octagon. Additionally, an enclosure suitable for use with the present invention is not limited to a square or rectangle shaped enclosure but may be any suitable shape, such as, e.g., a trapezoidal shaped enclosure. The base of the present invention is formed such that it preferably conforms to the specific shape of the enclosure to which the base is attached.

The enclosure 110 is preferably divided by an internal wall 124 into an upper 120 compartment and a lower 122 compartment. CRTs 126 and PWBs 130 are preferably mounted in the lower compartment 122, and a mirror M and a screen S are preferably mounted in the upper compartment 120. At least one projection lens 128 preferably extends from the lower compartment 122 into the upper compartment 120 through the internal wall 124. The upper compartment 120 is preferably tightly sealed from the lower compartment 122 in order to protect the inside of the upper compartment 120 from dust and other foreign materials that might otherwise be introduced from the lower compartment 122. The enclosure 110 is preferably constructed using light weight materials and methods, such as, e.g., molded plastic foam components formed from expanded polystyrene or phenolic that is sandwiched between coatings of an appropriate structural material such as plastic. Appropriate materials and methods to construct an enclosure using light weight materials are further described in copending U.S. patent application Ser. No. 09/643,892 to Lowe entitled "Foam Cabinetry for Electronic Devices," which is fully incorporated herein. Alternatively, the top panel 112, front panel 116, rear panel 118, and side panels (not shown) of the enclosure 110 may be constructed of injection molded plastic, vacuum formed plastic, particle board, other wood-based materials, or the like.

Rather than a bottom panel typical of the prior art, such as, e.g., bottom panel 14 of cabinet 10 illustrated in FIG. 1, the PTV cabinet 100 of the present invention includes an integrally weighted base 150. In the embodiment illustrated in FIG. 2, the base 150 includes a frame 151 and fill material 158 located within the frame 151. The frame 151 is preferably a stamped sheet metal frame formed using a master mold. The mold is configured in the shape of the desired frame, namely, the mold is configured to produce frames that conform to the footprint of the enclosure to which the base will be attached. To produce a metal frame 151, a piece of metal, such as, e.g., a sheet of metal, is placed over the mold. Subsequently, a stamping ram is used to press or force the metal into the contours of the mold, thereby forming a stamped metal frame 151 that substantially conforms to the contours of the mold. Since the mold is configured to conform to the footprint of the enclosure, the resultant stamped metal frame 151 also conforms to the footprint of the enclosure. Alternatively, a plastic material may be used to form frame 151 in a manner known in the art. If the frame 151 is formed from metal, the frame 151 further acts as a radiation shield, i.e., a metal frame 151 provides the base 150 with an additional function of being able to reduce the emission of electromagnetic radiation through the lower compartment 116 of the enclosure 110. Additionally, when the frame 151 is formed from a non-metallic material, such as, e.g., a plastic material, and concrete is used as the fill material 158, metallic fibers or particles may be added to the concrete in order to impart some ability to the base 150 to act as a radiation shield.

After manufacturing the frame 151, a fill material 158 is poured into the frame 151 in order to provide sufficient weight to a cabinet using the base 150 to satisfy industry standard load bearing tests. In one embodiment, the fill material 158 is a concrete mixture. When concrete is used as the fill material, a fibrous material may be added to the concrete to provide structure within the concrete to increase the tensile properties of the fill material. In another embodiment, the fill material 158 may be a metallic material. In still other embodiments, the fill material 158 may be any other material having a sufficient density such that the resultant weight of the base 150 is sufficient to balance the PTV cabinet 100 and prevent tip over.

After the fill material 158 is poured into the frame 151, the fill material 158 is allowed to harden or set. After setting, the top of the fill material 158 is abraded or ground to substantially the same level as the top of the frame 151, forming a substantially flat surface. Any suitable process, such as, e.g., mechanical abrasion, chemical abrasion, or mechanical cutting techniques, may be used to abrade the fill material 158. The base 150 is then attached to the enclosure 110 using any suitable technique, including adhesives, brackets, rivets, screws, and the like. The process of setting fill material 158 into the frame 151 is preferably accomplished after the frame 151 has been removed from the mold. It is contemplated, however, that the process of setting fill material 158 into the frame 151 may be accomplished prior to the removal of the frame 151 from the mold.

Figure 3A:
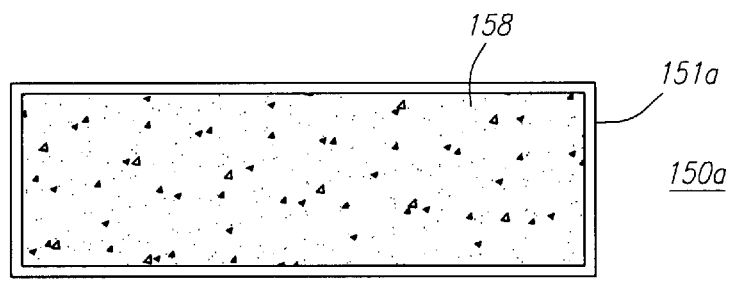
FIG. 3A is a top view of an embodiment of the base shown in FIG. 2 configured for a rectangular shaped PTV cabinet.
Figure 3B:
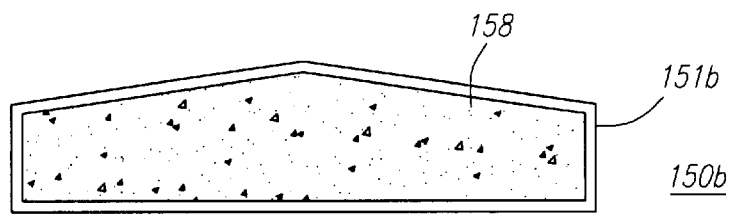
FIG. 3B is a top view of an embodiment of the base shown in FIG. 2 configured for a pentagonal shaped PTV cabinet.
Figure 3C:
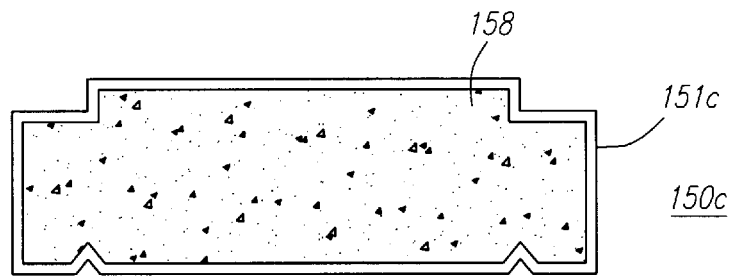
FIG. 3C is a top view of an embodiment of the base shown in FIG. 2 configured for a custom shaped PTV cabinet.
Figure 3D:
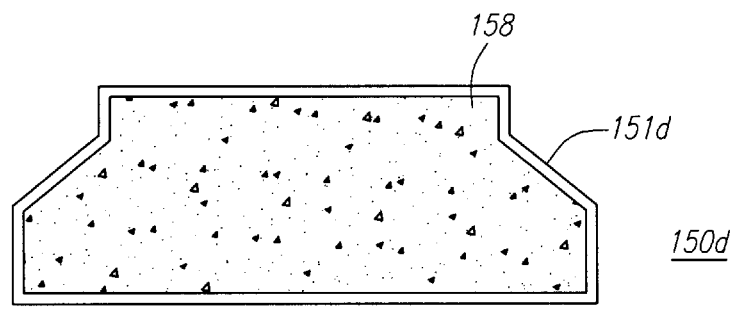
FIG. 3D is a top view of an embodiment of the base shown in FIG. 2 configured for another custom shaped PTV cabinet.

As previously discussed, the base of the present invention may be shaped in any configuration that matches the profile or footprint of an enclosure to which the base is to be attached. FIGS. 3A–3D illustrate top views of several exemplary embodiments of base 150. FIG. 3A shows a base 150a configured for attachment to an enclosure that is substantially rectangular in shape. FIG. 3B shows a base 150b configured for attachment to an enclosure that is substantially pentagonal in shape. FIGS. 3C and 3D illustrate bases 150c and 150d configured for attachment to enclosures that are irregular in shape. As evident in FIGS. 3A–3D, the shape of frames 151a–151d dictate the shape of respective bases 150a–150d.

Figure 4:
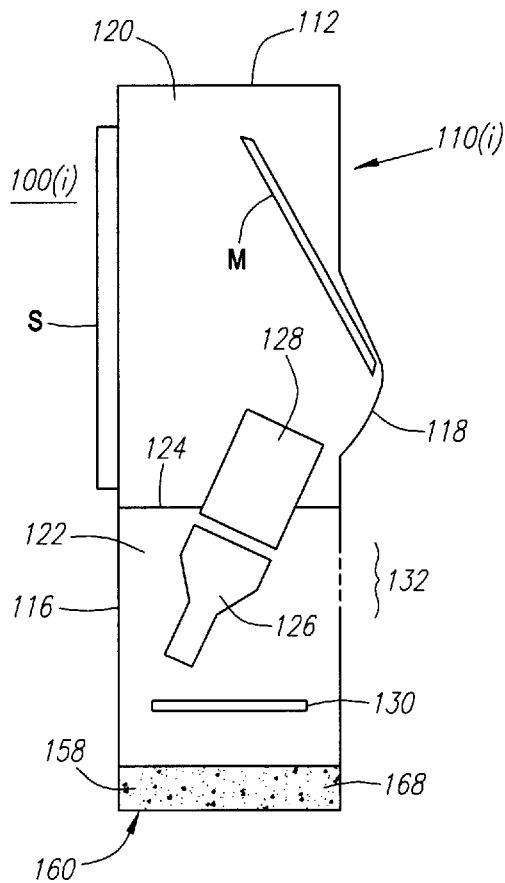
FIG. 4 is a side view of a base of the present invention without a separate frame, attached to a PTV cabinet.

Illustrated in FIG. 4 is a PTV cabinet 100(i) including an enclosure 110(i) and another embodiment of the base of the present invention. The PTV cabinet 100(i) includes substantially the same components as PTV cabinet 100 previously described and shown in FIG. 2. Additionally, enclosure 110(i) is capable of being constructed in substantially the same manner as enclosure 110.

As with PTV cabinet 100, PTV cabinet 100(i) replaces a typical bottom panel or region of the prior art with a base 160. Unlike the base 150 shown in FIG. 2, base 160 does not include a separate frame. Rather, to manufacture the base 160, fill material 168 is poured directly into a master mold. As with the manufacture of the frame 151 of base 150, the mold used to produce the base 160 is configured in the shape of the desired base. Generally, this shape corresponds to the footprint or profile of the enclosure 110(i) to which the base 160 will be attached. In one embodiment, the fill material 168 is a concrete mixture. When concrete is used as the fill material 168, fibers or fibrous material is added to the concrete to provide structure within the concrete to increase the tensile properties of the fill material 168. The addition of fiber to increase the tensile strength of the concrete is particularly important with base 160, as compared to base 150, since base 160 does not include a separate frame to provide additional support to the base 160. To impart some ability to shield radiation to the base 160, the fibers added to the concrete may be metallic in nature or if non-metallic fibers are used to increase tensile strength, separate metallic particles may be added to the fill material 168. Alternatively, the fill material 168 may be a metallic material. In still other embodiments, the fill material 168 may be any other material that possesses a density greater than the material used to construct the panels of the enclosure 110(i), and therefore a density that results in a weight sufficient to balance the PTV cabinet 100(i).

After the fill material 168 is poured into the mold, the fill material 168 is allowed to harden or set. In one embodiment, after setting, the top of the fill material 168 is abraded to a substantially level surface. Any suitable process, such as, e.g., mechanical abrasion, chemical abrasion, or mechanical cutting techniques, may be used to abrade the fill material 168. The base 160 is then attached to the enclosure 110(i) using any suitable technique, such as, e.g., screws, adhesives, brackets, or the like.

Figure 5:
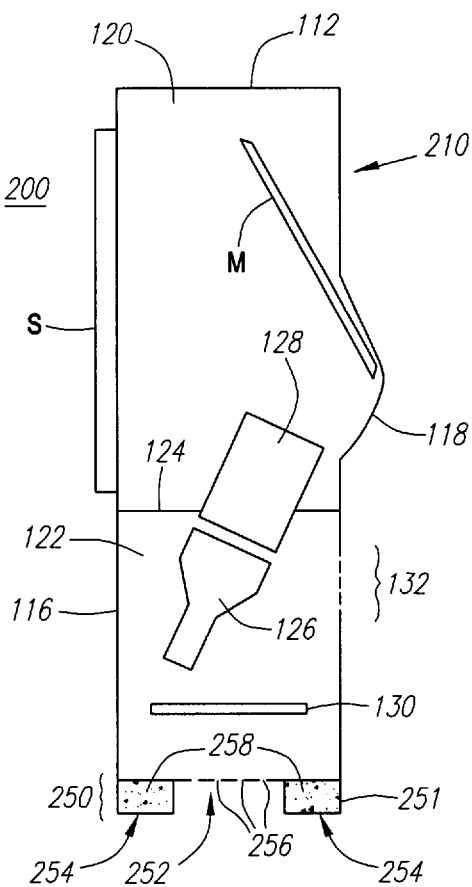
FIG. 5 is a side view of a base of the present invention having a frame, fill material within the frame, and a raised region along the frame, attached to a PTV cabinet.
Figure 6:
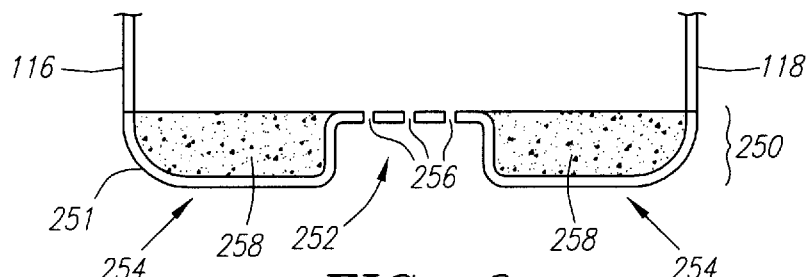
FIG. 6 is a side view of the base illustrated in FIG. 5.

Turning to now to FIG. 5, a PTV cabinet 200 having an enclosure 210 and another embodiment of the base, namely, base 250, of the present invention is illustrated. Additionally, FIG. 6 provides a close-up, side view of the base 250. The PTV cabinet 200 includes substantially the same components and is constructed in substantially the same manner as PTV cabinet 100 previously described and shown in FIG. 2. As with PTV cabinet 100, PTV cabinet 200 replaces a typical bottom panel or region of the prior art with a base 250. The base 250 is attached to the front panel 116, the rear panel 118 and the side panels (not shown) of the enclosure 210, opposite the top panel 112 of the enclosure 210, to form the bottom surface of the PTV cabinet 200. The base 250 preferably is divided into at least one raised region or area 252 and at least one lower region 254 adjacent each raised region 252. The base 250 includes a frame 251 into which fill material 258 is set. The frame 251 is manufactured in substantially the same manner, and is capable of being made using substantially the same materials, as frame 151 previously described and illustrated in FIG. 2. Reference is made to the description of frame 151 as that description substantially applies to frame 251.

Preferably, the fill material 258 is set in substantially the lower regions 254 of the frame 251, although it is to be expected that some fill material 258 may also contact the raised region 252 during this process. After the fill material 258 is poured into the frame 251, and preferably substantially into the lower region 254 of the frame 251, the fill material 258 is allowed to set or cure. Preferably, once the fill material 258 solidifies, the top surface of the fill material 258 is abraded or ground such that the top surface of the fill material 258 is substantially level with the top surface of the raised region 252. The abrasion or grinding process is preferably accomplished through mechanically abrasive methods, although chemicals or any of the other abrasion methods described herein may also be used during this process.

The base 250 may also include a plurality of openings 256 disposed on the top surface of the raised region 252. When present, the openings 256 allow for heat radiating from the components of the PTV, such as, e.g., the CRTs 126 and the PWBs 130, to dissipate from the lower compartment 116. To further increase heat dissipation from the lower compartment 116, a set of ventilation holes 132 positioned on the rear panel 118 is optionally provided. One skilled in the art would understand that the location of the set of ventilation holes 132 may vary depending on the desired heat dissipation effect. In embodiments of the base 250 having a plurality of openings 256, any fill material 258 covering the openings 256 is removed from the top surface of the raised region 252 during the abrasion or grinding process.

Figure 7:
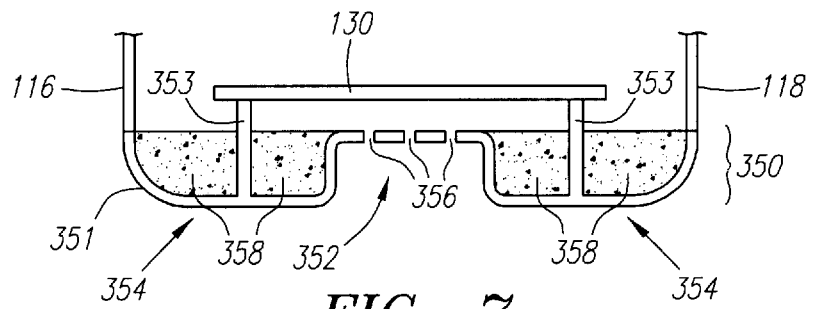
FIG. 7 is a side view of a base having an elevated portion for attachment of a PTV component to the base.

Turning now to FIG. 7, another embodiment of the base of the present invention, base 350, is illustrated. Base 350 has a frame 351 that further includes a plurality of elevated portions 353 disposed within the lower regions 354 of the frame 351 in addition to a raised region 352. Although two elevated portions 353 are illustrated, any multiple number of elevated portions 353 may be implemented in base 350. The elevated portions 353 are configured for securably attaching thereto a component of the PTV, such as, e.g., the PWB 130, to the base 350. Each elevated portion 353 may be solid but for an opening (not shown) configured for securably inserting an attachment element, such as, e.g., a screw, therein. In practice, for example, the PWB 130 is placed atop the elevated portions 353 prior to the coupling of the base 350 to the cabinet, and attachment elements are inserted through the PWB 130 and into each opening of each respective portion 353. As a result, the PWB 130 is secured to the base 350. Base 350 is manufactured in substantially the same manner, and is capable of being made using substantially the same materials, as base 250.

Figure 8A:
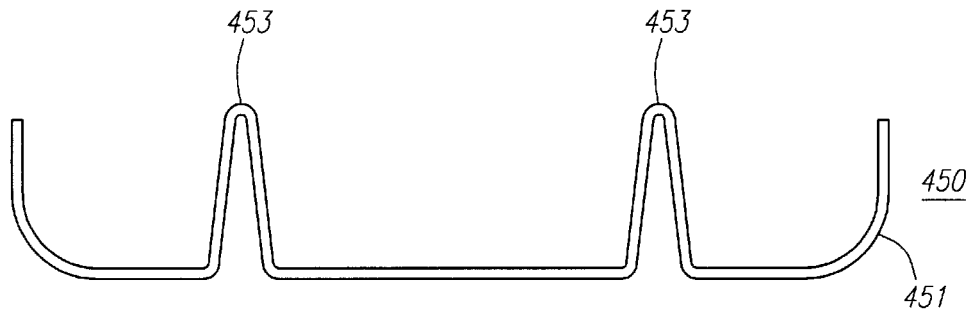
FIG. 8A is a side view of a base having a frame with a plurality of dimpled areas.
Figure 8B:
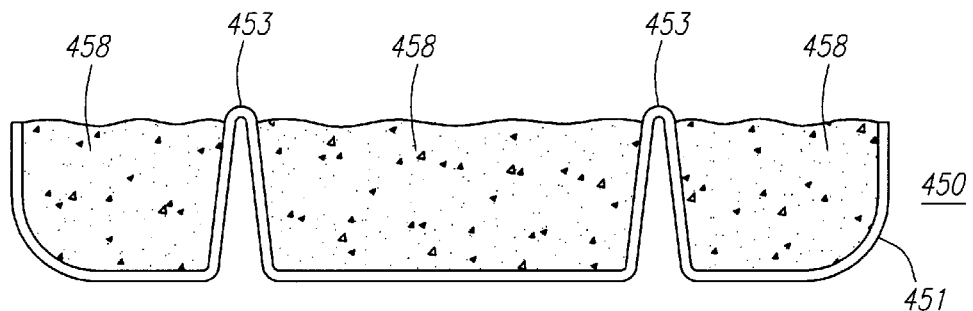
FIG. 8B is a side view of the base shown in FIG. 8A with fill material disposed within the frame.
Figure 8C:
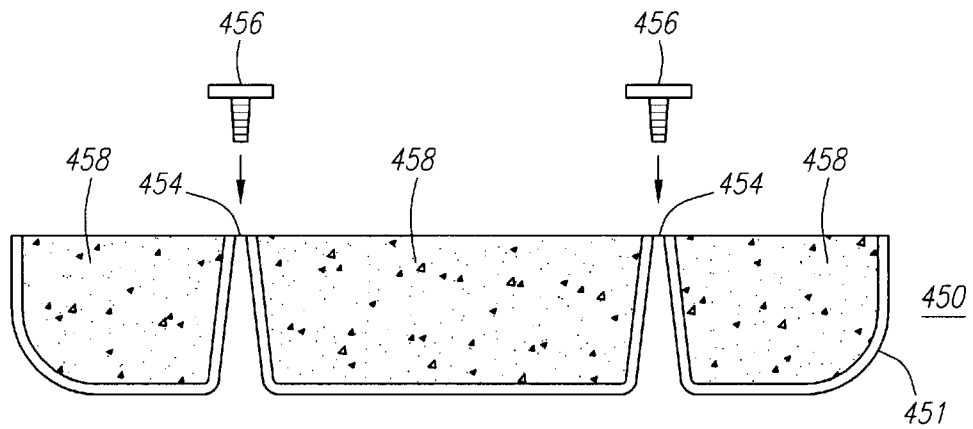
FIG. 8C is a side view of the base shown in FIG. 8A with the top surface of the fill material abraded, and the tops of the dimpled areas removed in order to provide openings for the insertion of attachment elements.

FIGS. 8A–8C illustrate another embodiment of the base of the present invention. Base 450 is formed with a plurality of dimpled areas 453 that, when removed during the manufacturing process, leave openings 454 through which attachment elements 456 may be securably inserted. FIG. 8A shows base 450 with frame 451 having a plurality of raised, dimpled areas 453. The frame 451 of base 450 is formed using substantially the same manufacturing process used when forming the frames of the other bases previously described. For example, a process such as that used to form frame 151 of base 150 may be used to form frame 451. Further, the same materials useable to form the other frames of the previously described bases, such as frame 151, may be used for frame 451. Consequently, reference is made to the description of the materials and process for forming frame 151, as that description also applies to the materials and process for manufacturing frame 451.

After frame 451 is formed, a fill material 458 is poured into the frame 451 and allowed to set or harden. As with the other bases described previously, materials such as concrete, a concrete and fiber mixture, a concrete and metallic mixture if plastic is used to form the frame 451, and a metallic compound are useable as the fill material 458. Once the fill material 458 is set, a suitable abrasive or grinding process is used to level the top surface of the fill material 458. Mechanical abrasion or chemical abrasion may be used to perform this function.

Additionally, during the abrasion or grinding process, the tops of the dimples 453 are removed from the frame 451. As a result of the removal of the tops of the dimples 453, a number of openings 454 corresponding to the number of dimples 453 removed are formed. As illustrated in FIG. 8C, the openings 454, formed after the removal of the tops of the dimples 453, are configured to allow an attachment element 456, which may be, e.g., a screw, to be securably inserted therein. A component of the PTV may be secured to the base 450 by inserting an attachment element 456 through the component and subsequently through an opening 454.

Figure 9A:
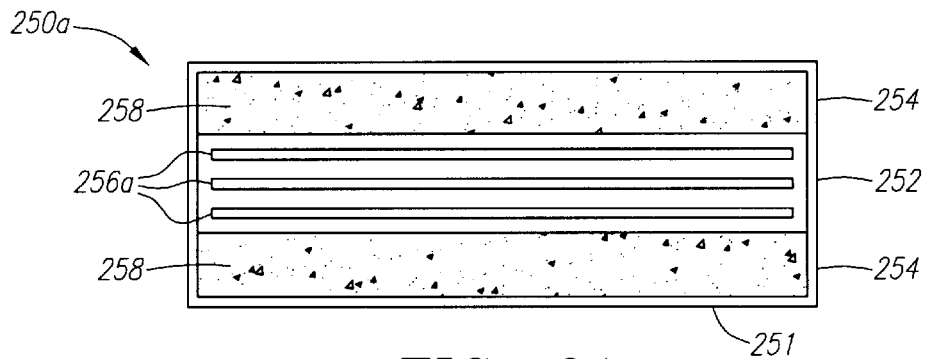
FIG. 9A is a top view of an embodiment of a base having parallel, length-wise openings.
Figure 9B:
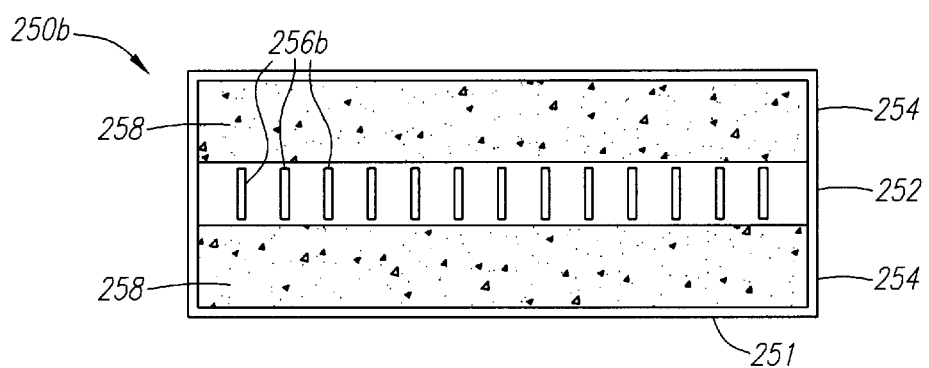
FIG. 9B is a top view of an embodiment of a base having parallel, width-wise openings.
Figure 9C:
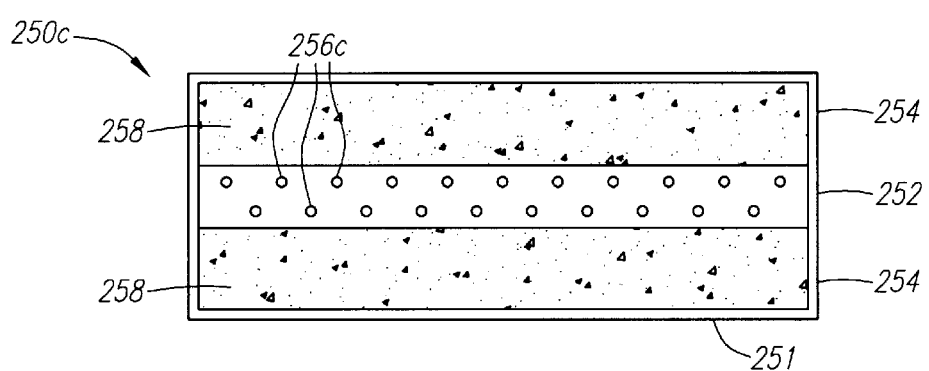
FIG. 9C is a top view of an embodiment of a base having a plurality of circular openings.
Figure 9D:
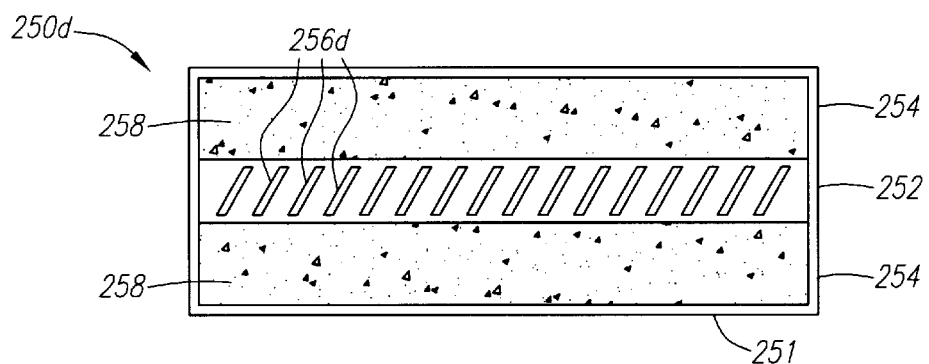
FIG. 9D is a top view of an embodiment of a base having diagonally parallel openings.

FIGS. 9A–9D illustrate top views of several embodiments of base 250 of the present invention, showing possible configurations for the openings 256 of base 250. FIG. 9A illustrates a base 250a having openings 256a that are oriented parallel relative to each other and also extend along the length of a raised region 252 and of the base 250a. FIG. 9B illustrates a base 250b having openings 256b that are oriented parallel to each other but that extend along the width of a raised region 252 and of the base 250b. FIG. 9C illustrates a base 250c having openings 256c that are circular in shape and that are dispersed throughout a raised region 252 of base 250c. FIG. 9D shows a base 250d having diagonally oriented openings 256d on the raised region 252. Other configurations and shapes of openings 256 are also capable of being implemented on the base 250, or any other of the previously described bases having openings allowing for the venting of excess heat from the interior of a PTV cabinet, of the present invention. One skilled in the art would appreciate that the configurations and shapes of the openings 256 may vary based upon the desired heat dissipation effect, for example.

Figure 10:
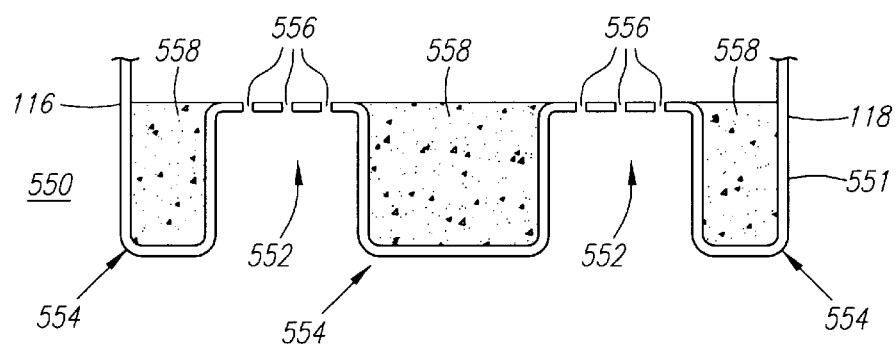
FIG. 10 is a side view of a base having a plurality of raised regions.

The present invention also provides for a base 550 divided into a plurality of raised regions. Turning to FIG. 10, a base 550 is illustrated that includes frame 551 divided into a plurality of raised regions 552. Although two raised regions 552 are shown, it is envisioned that any multiple numbers of raised regions 552 may be implemented in base 550. The frame 551 of base 550 further includes lower regions 354 adjacent to each raised region 552. Fill material 558 is poured into the frame 551, and substantially within the lower regions 554, allowed to set or harden, and then abraded or ground to substantially the same level as the top surface of the raised regions 552. The base 550 also includes a plurality of openings 556, to allow for heat dissipation, on the top surface of the raised regions 556. Any fill material 558 that may have accumulated over these openings 556 during the pour and set processes are abraded or ground in order to keep the openings 556 unobstructed.

Figure 11A:
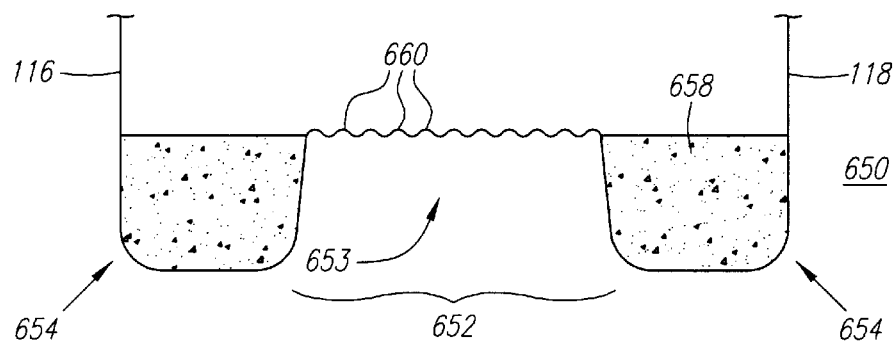
FIG. 11A is a side view of an unfinished base without a separate frame and having a plurality of dimples along its center.
Figure 11B:
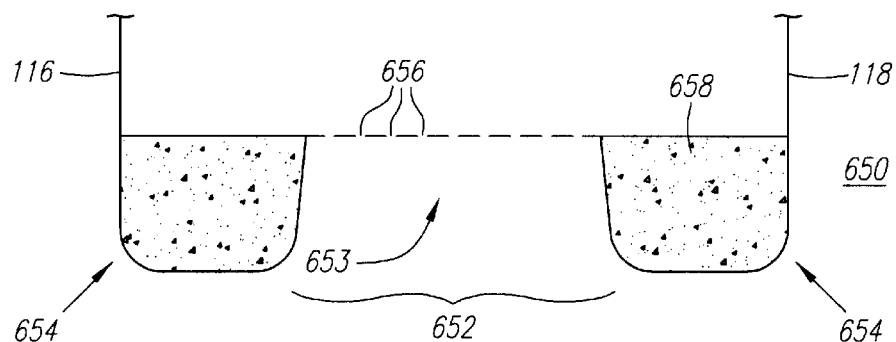
FIG. 11B is a side view of the base of FIG. 11A after the base has been abraded to remove the dimples and to expose a plurality of openings suitable for heat dissipation.
Figure 11C:
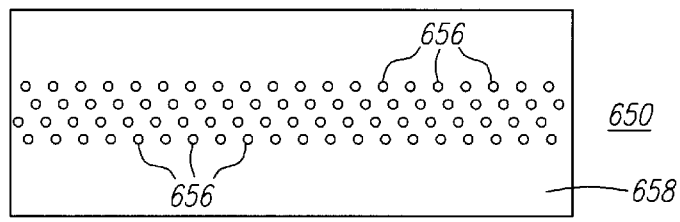
FIG. 11C is a top view of the base shown in FIG. 11B.

Turning now to FIGS. 11A and 11B, another embodiment, base 650, of the present invention is illustrated. Base 650 is similar to base 160, described previously and illustrated in FIG. 4, in that neither base 650 nor base 160 has a separate frame into which fill material is poured and allowed to set. Base 650 is formed by pouring fill material 658 directly into a mold. Additionally, the mold for base 650 is configured to form a base 650 having a central area 652 with a plurality of dimples 660 over an open space 653. Once the fill material 658 hardens or sets, a suitable abrasive or grinding method is used to smoothen the top surface of the fill material 658. During the abrasion or grinding process, the dimples 660 are also removed, thereby leaving a plurality of openings 656. The openings 656 allow heat to dissipate from the interior of the cabinet to which the base 650 is attached. FIG. 11C shows a top view of the base 650 and the openings 656 formed by the removal of the dimples 660 during the abrasion process.

The bases of the present invention allow a cabinet to be integrally weighted in a manner suitable for satisfying industry standard load tests, such as, e.g., the UL tip over test, without the need for placing additional, individual weights, see, e.g., counterweights 36 of cabinet 10 in FIG. 1, inside the cabinet, unlike prior art cabinets. One advantage of the bases of the present invention over the prior art is that the possibility of individual counterweights, such as, e.g., counterweights 36 of cabinet 10 in FIG. 1, becoming detached during the manufacture, transport, or life of the cabinet 10 is eliminated. Consequently, the ability of a cabinet using the present bases to satisfy standardized load bearing tests throughout its lifetime is ensured and maintained.

The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A base for attachment to a bottom of a cabinet having a plurality of panels forming a footprint, comprising:
   a frame conforming to the footprint of the cabinet, and
   fill material disposed within the frame,
   wherein the frame further comprises a raised area with a top surface, and
   a lower region adjacent the raised area, and wherein the fill material is disposed in the lower region of the frame,
   wherein the frame further comprises a plurality of elevated portions within the lower region, wherein each respective elevated portion includes an opening through which an attachment element is inserted.

2. The base of claim 1 wherein the fill material disposed within the frame is concrete.

3. The base of claim 1 wherein the fill material disposed within the frame is a mixture of concrete and fibers.

4. The base of claim 1 wherein the frame is plastic and the fill material includes metal.

5. The base of claim 1 wherein the frame further comprises a plurality of openings on the top surface of the raised area.

6. A cabinet for a projection television comprising:

an enclosure suitable for housing a mirror, a plurality of CRTs, and a projection lens, the enclosure having a top panel, a front panel, a rear panel, and side panels in connection with the top, front, and rear panels, wherein the front, rear, and side panels form a footprint opposite the top panel, and a base having a frame and fill material disposed within the frame, wherein the base is attached to the footprint of the enclosure, wherein the frame further comprises a plurality of elevated portions, each elevated portion having an opening through which an attachment element is inserted.

7. The cabinet a claim 6 wherein the frame of the base further comprises a raised area with a top surface, and at least one lower region adjacent the raised area, wherein the fill material is deposited into the at least one lower region adjacent the raised area of the frame.

8. The cabinet of claim 7, wherein a top surface of the fill material is level with the top surface of the raised area of the frame.

9. The cabinet of claim 7, wherein the top surface of the raised region includes a plurality of openings.

10. The cabinet of claim 6, wherein the fill material comprises a material chosen from the group consisting of concrete, a mixture of concrete and fibers, a mixture of concrete and metal, and metal.

11. The cabinet of claim 6, wherein the frame comprises a plastic material.

12. The cabinet of claim 6, wherein the frame comprises a metal.

13. A cabinet for a projection television comprising:

an enclosure, and a base coupled to the enclosure, the base comprising a frame and fill material disposed within the frame, the frame comprising a plurality of elevated portions, each elevated portion having an opening through which an attachment element is inserted.

14. The cabinet of claim 13 wherein the frame further comprises a raised area with a top surface.

15. The cabinet of claim 14 wherein the frame further comprises a lower region adjacent the raised area, wherein the fill material is deposited in the lower region adjacent the raised area of the frame.

16. The cabinet of claim 14, wherein a top surface of the fill material is level with the top surface of the raised area of the frame.

17. The cabinet of claim 14, wherein the top surface of the raised region includes a plurality of openings.

18. The cabinet of claim 13, wherein the fill material comprises a material chosen from the group consisting of concrete, a mixture of concrete and fibers, a mixture of concrete and metal, and metal.

19. The cabinet of claim 13, wherein the frame comprises a plastic material.

20. The cabinet of claim 13, wherein the frame comprises a metal.

* * * * *